No. 634,217. Patented Oct. 3, 1899.
J. A. SECOR.
MEANS FOR MARINE PROPULSION.
(Application filed Mar. 8, 1898. Renewed Jan. 5, 1899.)

(No Model.) 7 Sheets—Sheet 1.

Witnesses
Charles Hanimann
B. Safery.

John A. Secor Inventor
By his Attorney
Chas. W. Corbes

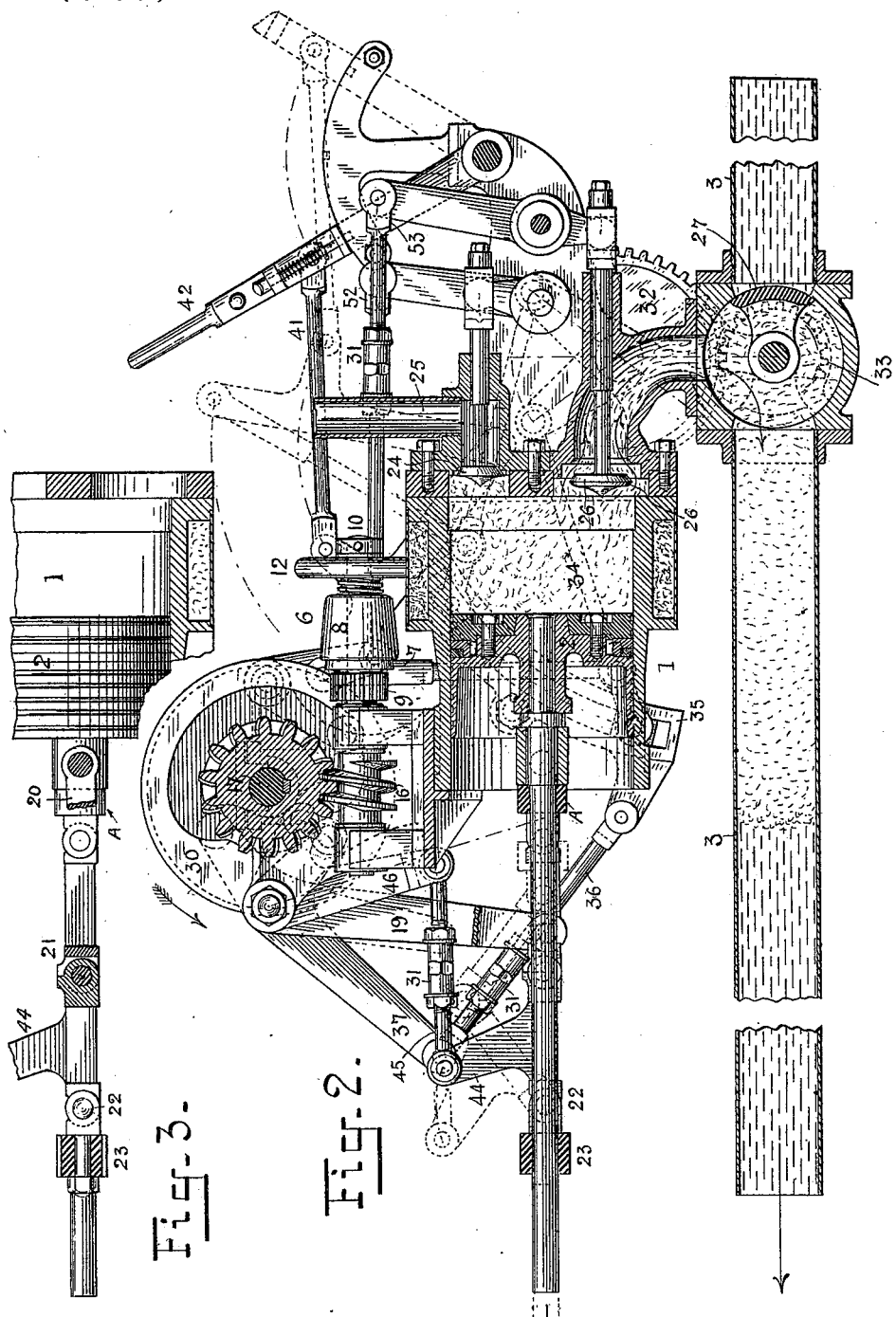

No. 634,217. Patented Oct. 3, 1899.
J. A. SECOR.
MEANS FOR MARINE PROPULSION.
(Application filed Mar. 8, 1898. Renewed Jan. 5, 1899.)
(No Model.) 7 Sheets—Sheet 3.

Witnesses
Charles Hanimann.
B. Safby.

John A. Secor Inventor
By his Attorney

No. 634,217. Patented Oct. 3, 1899.
J. A. SECOR.
MEANS FOR MARINE PROPULSION.
(Application filed Mar. 8, 1898. Renewed Jan. 5, 1899.)
(No Model.) 7 Sheets—Sheet 4.

No. 634,217. Patented Oct. 3, 1899.
J. A. SECOR.
MEANS FOR MARINE PROPULSION.
(Application filed Mar. 8, 1898. Renewed Jan. 5, 1899.)
(No Model.) 7 Sheets—Sheet 5.

Witnesses
Charles Hanimann
B. Saxberg

John A. Secor Inventor
By his Attorney

No. 634,217. Patented Oct. 3, 1899.
J. A. SECOR.
MEANS FOR MARINE PROPULSION.
(Application filed Mar. 8, 1898. Renewed Jan. 5, 1899.)
(No Model.)
7 Sheets—Sheet 6.
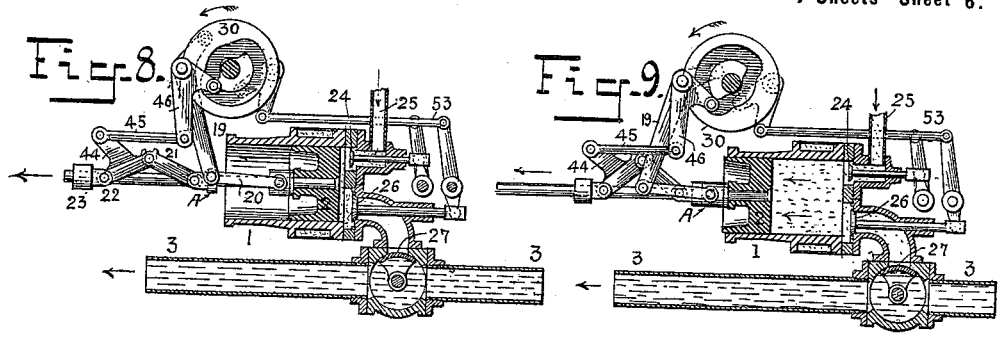
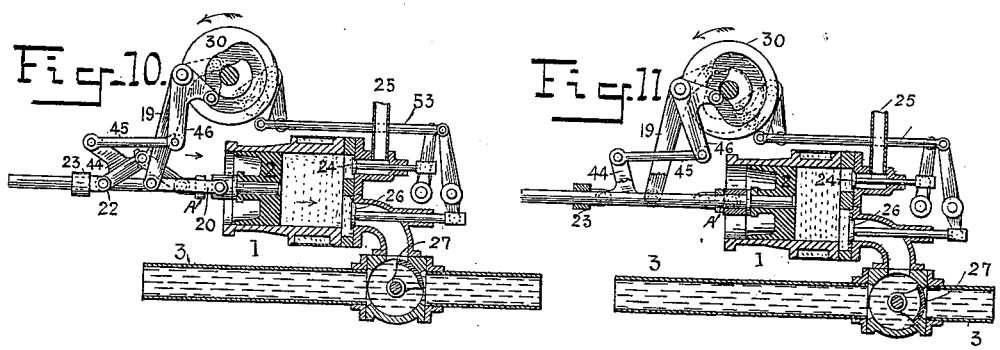
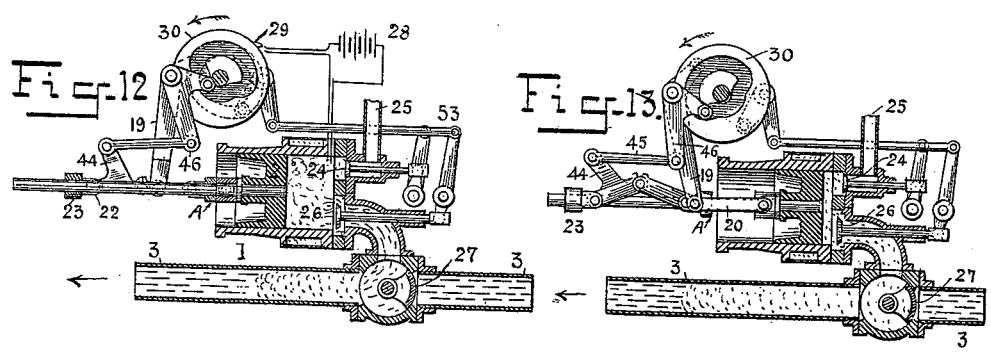

No. 634,217. Patented Oct. 3, 1899.
J. A. SECOR.
MEANS FOR MARINE PROPULSION.
(Application filed Mar. 8, 1898. Renewed Jan. 5, 1899.)
(No Model.) 7 Sheets—Sheet 7.
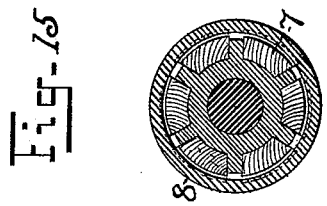
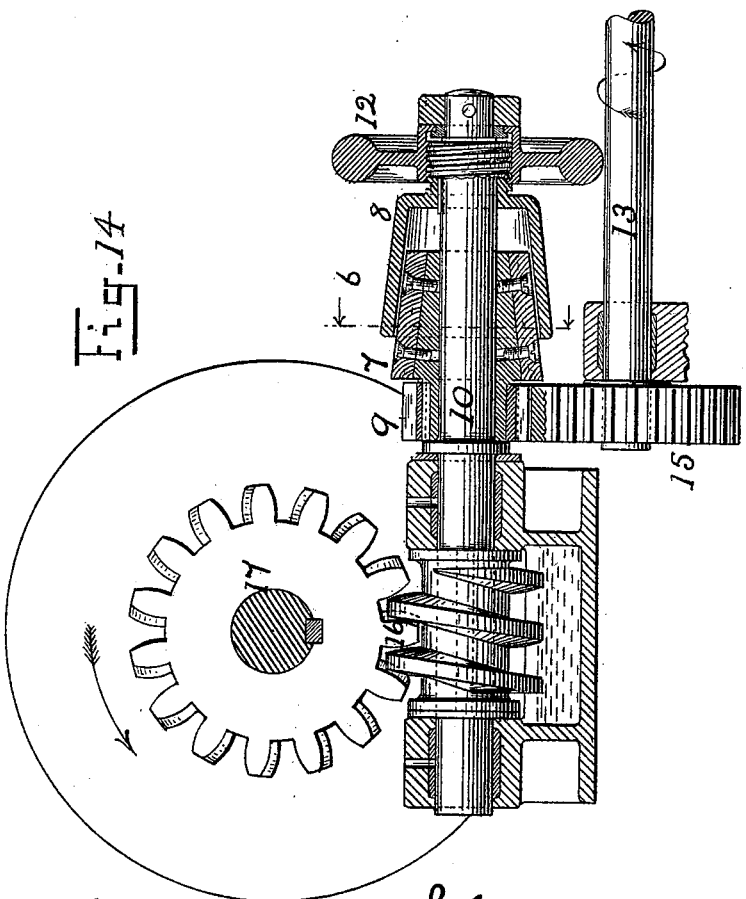
Witnesses
Chas. Hanimann
George A. Rowell.
John A. Secor Inventor
By his Attorney
Chas N. Forbes

United States Patent Office.

JOHN A. SECOR, OF NEW YORK, N. Y.

MEANS FOR MARINE PROPULSION.

SPECIFICATION forming part of Letters Patent No. 634,217, dated October 3, 1899.

Application filed March 8, 1898. Renewed January 5, 1899. Serial No. 701,283. (No model.)

*To all whom it may concern:*

Be it known that I, JOHN A. SECOR, a citizen of the United States, residing in the city of New York, borough of Brooklyn, county of Kings, State of New York, have invented certain new and useful Improvements in Means for Marine Propulsion, of which the following, taken in connection with the accompanying drawings, is a specification.

The invention comprehends a motive power derived from the force of explosive gases acting upon and expelling a body of water from a submerged conduit placed fore and aft the vessel.

The accompanying drawings illustrate an apparatus embodying the invention in duplicate organization and also in relative arrangement in series, in which—

Figure 1:
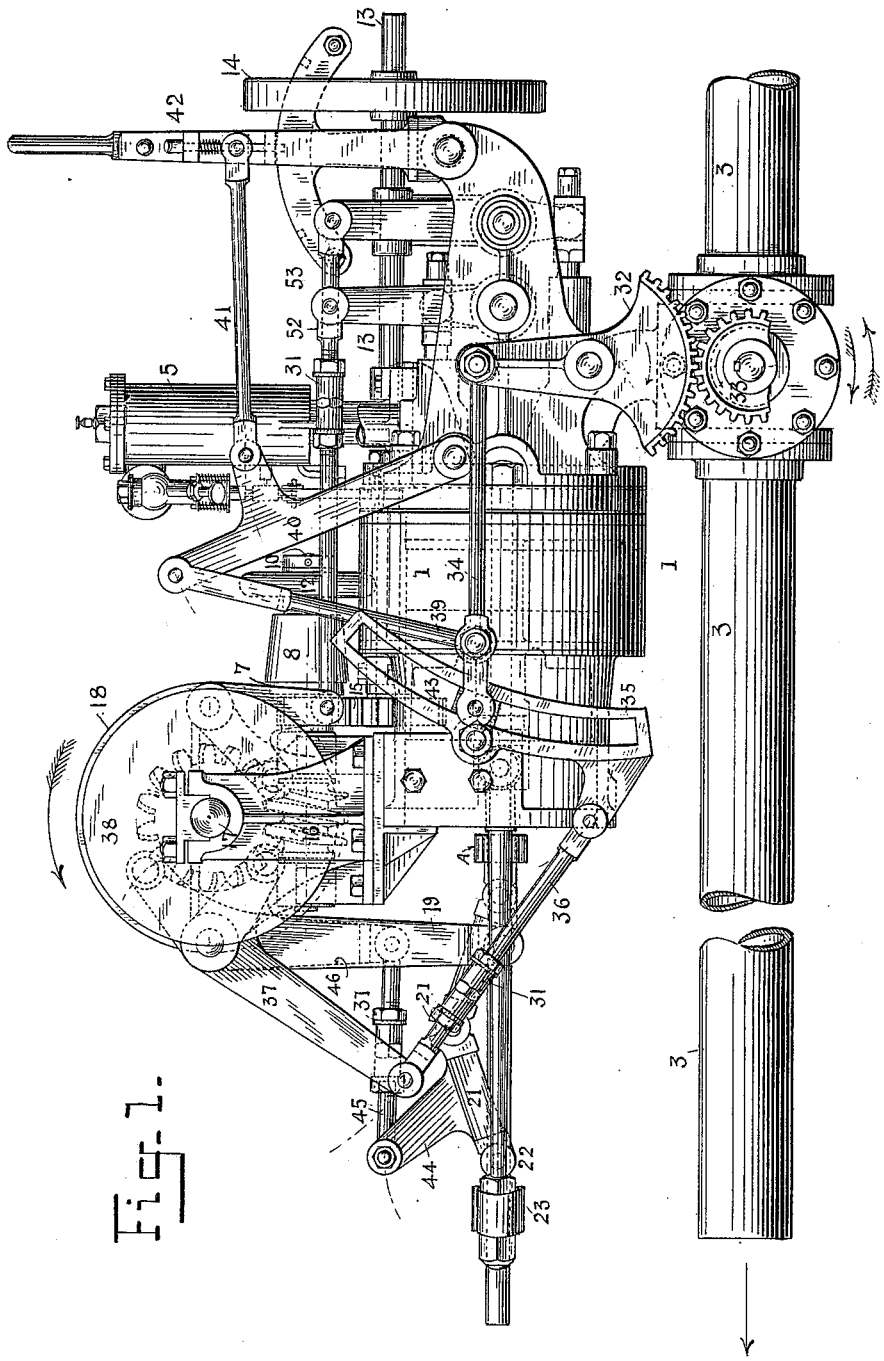
Figure 4:
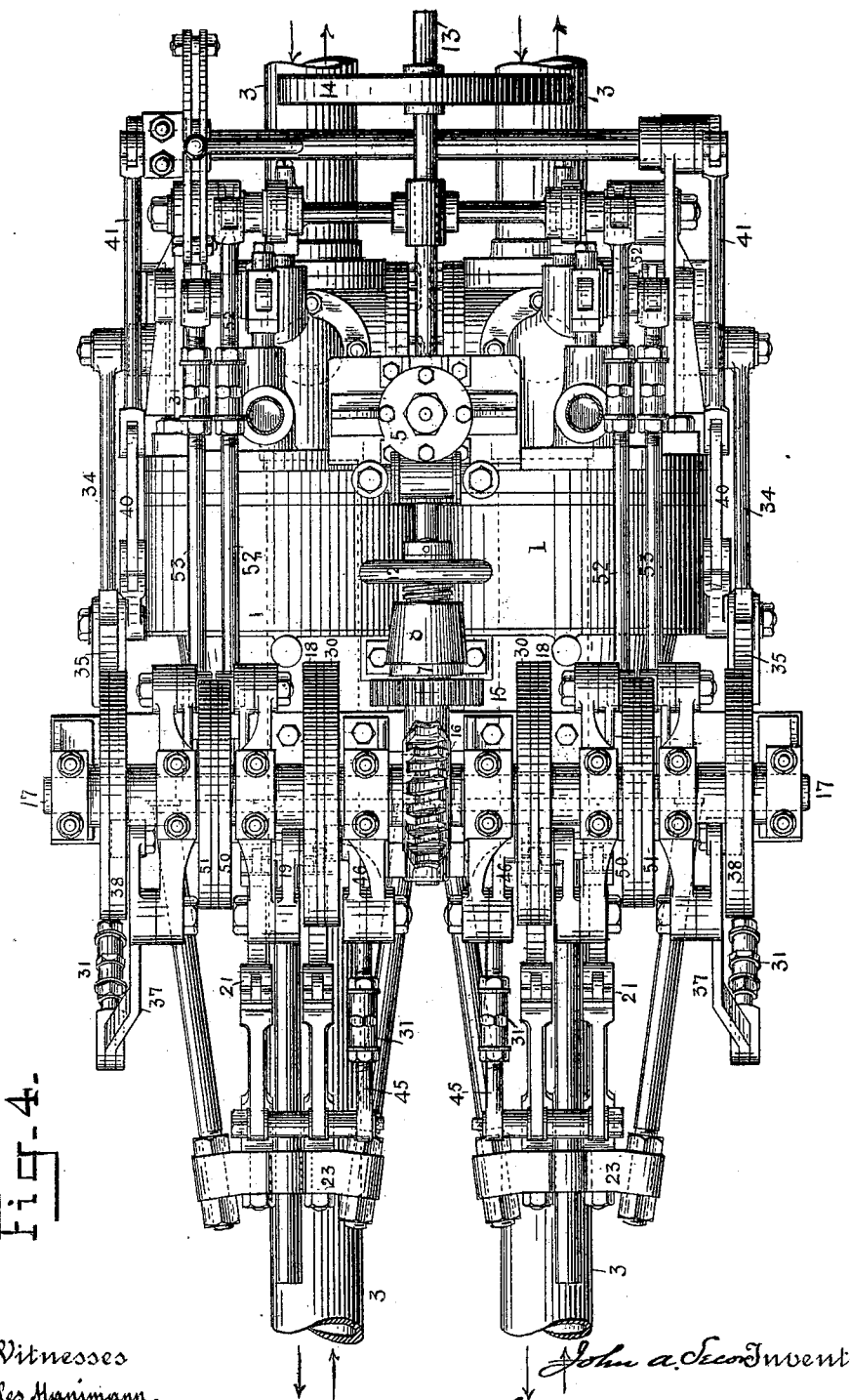
Figure 5:
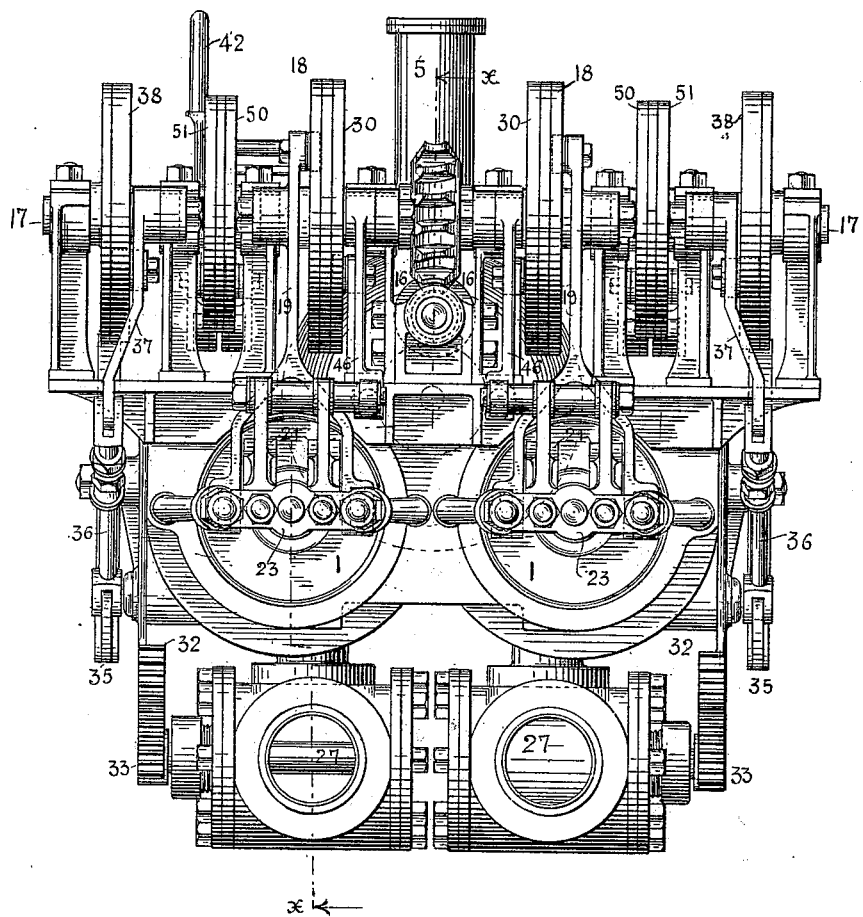
Figure 6:
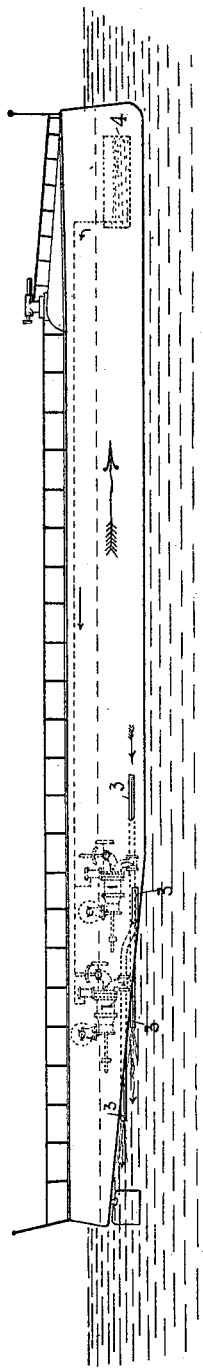
Figure 7:
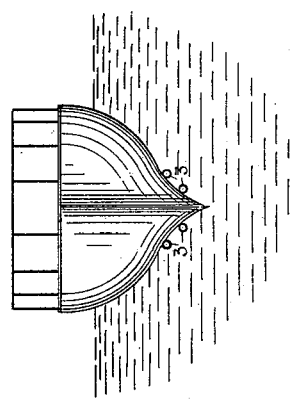

Figure 1 is a side elevation; Fig. 2, a vertical sectional view on line $x\,x$, Fig. 5; Fig. 3, a detached sectional view of a piston and connections; Fig. 4, a plan view; Fig. 5, an end elevation. Fig. 6 represents a craft containing a series of the apparatus. Fig. 7 is a rear view of the hull, showing an end view of the submerged conduits. Figs. 8, 9, 10, 11, 12, and 13 are sectional views illustrating the method of operation of the cycle of movement of the parts involved in a double stroke of the piston and interval of explosive action. Figs. 14 and 15 represent enlarged sectional views of the clutch mechanism.

1 1 represent a pair of explosion-cylinders with compressing reciprocating pistons 2 2. The cylinders are closed at one end and open at the opposite end, the pistons being operated from the open end of the cylinders in manner similar to a single-acting or trunk engine, as shown in Fig. 2. In Figs. 4 and 5 the two cylinders are shown arranged side by side on the same horizontal plane, but may be arranged in a different order and in greater or less number, if required.

3 3 are water conduits or pipes placed fore and aft the vessel below the water-line and in submerged communication at their opposite ends with the water in which the vessel floats, as shown in Figs. 6 and 7. The respective conduits communicate intermediately and independently each with its own explosion-cylinder and project fore and aft from the connected passages therewith, the length and diameter and consequent capacity of the conduits being commensurate with the size of the explosion-cylinders and the volume of the exploding gas. In the use of two explosion-cylinders, as herein represented, two separate and independent water-conduits are used, the explosive action in the respective cylinders being regulated to act so as to expel the water in the respective conduits alternately. It will, however, be obvious that an increase in the number of explosion-cylinders, with a corresponding number of conduits acting alternately or a concentration of the conduits into a less number or into simultaneous action, is a mere matter of computation.

The following enumerated elements—viz., the explosion-cylinder, the compressing-piston therein, and the water-conduit—constitute the main parts of the invention, such essential adjuncts as the valve devices, the igniting devices, and the operating mechanism being capable of variation and substitution by equivalent means in practically carrying out the method of operation referred to.

The apparatus is shown, as in Fig. 6, located near the stern of the vessel and in series as illustrative of a duplication of the power, the supply-tank 4 being placed near the bow.

It will be understood that a small motor 5 is used of sufficient power to move the parts and produce the necessary degree of compression of the gas in the cylinder, the motor being fixed at any convenient position on the framework of the apparatus and capable of engagement or disconnection with the operative parts by means of a clutch device 6 or other suitable means.

In describing the details of the operating mechanism I will first indicate the cycle of movement of the reciprocating piston 2 and then follow the connected operative mechanism, as illustrated in Figs. 8 to 13, inclusive, in sequence corresponding to such cycle of movement and by which a clear understanding of the operation will be obtained.

Considering the position of the piston at the forward or closed end of the cylinder its first movement is continuous to the end of its outward stroke, and during this movement the explosive gas or constituents are drawn into the cylinder following the wake of the receding piston. The cylinder is now filled with the explosive gas at atmospheric pressure. The piston commences its return stroke and is moved a short distance, sufficient to compress the explosive gas to the desired degree, when it is arrested and secured and held in this position until the explosive action has occurred. The piston is then moved on to complete the remainder of its return stroke, by which the residuum of the combustion is expelled into the conduit. This completes the cycle of movement of the piston at each interval of the explosive action.

The water is admitted to the conduit during the first continuous movement of the complete outward stroke of the piston at the time the gases are drawn into the cylinder and also during its continued limited movement when the gas in the cylinder is compressed, the time of this greatest travel of the piston during its double stroke affording the water a corresponding greater period to fill the conduit. The gas is drawn into the explosion-cylinder and directly compressed therein to a definite degree and ignited in a static state, not requiring a transfer from an auxiliary reservoir nor from one side of the piston to the other with opportunity for expansion after the compression has been effected.

The motor 5 may be of any desired kind or type. In this instance a gas-motor is represented which may derive its supply from the tank 4. A friction-clutch device 6 is interposed between the motor and the connecting operative parts for the purpose of starting and stopping the same. This clutch device 6 (shown separately in the enlarged views Figs. 14 and 15) is a well-known form of friction-coupling, consisting of a conical disk 7 and hollow cone 8, the former being connected with the loose gear 9 and the latter to the shaft 10 by means of the usual feather, which causes it to turn with the shaft and renders it capable of longitudinal movement thereon by means of the screw hand-wheel 12 for contact coupling with the disk 7. This type of coupling is especially convenient in conjunction with a gas-motor, which sometimes requires preliminary time and adjustment to set it in working motion, the clutch permitting an engagement or disconnection while the motor is in operation.

The main shaft 13 is operated directly by the motor 5, its spur-gear 15 meshing with the loose gear 9, connected to the coupling-disk 7 on the counter-shaft 10, which is provided with a worm-gear 16, that operates the shaft 17, to which a series of cams are fixed that connect with and operate the various mechanisms, which will hereinafter be particularly referred to. This shaft 13 is also provided with a fly-wheel 14 to equalize the movement of the parts and which is also convenient for use in operating the apparatus by hand when disconnected from its source of power. The compressing-pistons 2 2 derive their movements from the cam-disks 18 through the pivoted bell-crank arms 19 and connecting links 20 with the piston-head.

The mechanism for securing the piston during the explosive action consists in jointed knuckles 21, pivoted at one extremity to a cross-pin 22, fixed to the cross-head 23, through which the piston-rod reciprocates, and pivoted to an abutting locking-block A reciprocating on the piston-rod at the opposite extremity. These knuckles are operated through the medium of the arm 44, rod 45, and bell-crank lever 46 engaging with the cam-disk 30.

The movements of the pistons 2 2 within the cylinders and the coincident movements of the knuckle for securing the piston and valve devices for admitting the gas to the cylinder and releasing the same therefrom are fully illustrated in their various and relative positions during each interval of the explosive action, together with the corresponding relative position of the reversing-valve with relation to the respective branches of the water-conduit, in Figs. 8 to 13.

In Fig. 8 the piston 2 is shown at its extreme throw or inward position, the inlet-valve 24 being open to admit the explosive from the supply-pipe 25, the explosion or release valve 26 and the reversing-valve 27 in the conduit being respectively closed. In this position of the parts referred to the knuckle 21 is also shown slightly open.

Fig. 9 shows the position of the piston at the opposite end of its stroke, and during this period the gas is drawn into the cylinder through the valve 24, the respective valves still remaining in their first relative position, while the knuckle 21 is elevated to its open extreme.

Fig. 10 shows the piston in a slightly-advanced position in its return stroke, the movement from the position shown in Fig. 9 also changing the relative position of the valves, the gas-inlet valve 24 and the explosion or release valve 26 being closed and the conduit-reversing valve 27 partly opened in order to anticipate and insure the closure of the inlet branch of the conduit and prepare a free passage for the force of the explosion to the body of water contained in the outlet branch.

Fig. 11 shows the position of the several parts at the point of the arrest of the movement of the piston after the compression of the gas and previous to the ignition of the same, the reversing-valve in the conduit being moved to close and cut off the inlet branch and the knuckle device 21 brought to a horizontal plane, whereby it forms in conjunction with the cross-head 23 and block A an abutment to the piston in resisting the reactionary force of the explosion within the cylinder.

Fig. 12 shows the position of the parts at the time of the explosive action, the explosion or releasing valve 26 being open and the other parts maintained in their former position. In this figure an electric igniter 28 is represented as operated by a tappet 29 on the cam-disk 30.

Fig. 13 represents the position of the respective parts immediately following the explosive action, the piston approaching the end of the remainder of its inward stroke, the knuckle released from its locked position, and the residuum of the exploded gas forced from the cylinder and outlet. At the completion of this stroke of the piston the parts reassume their respective positions (shown in Fig. 8) in readiness for the succeeding repetition of the operation.

The respective pistons, valve devices, and piston-locking knuckle 21 are operated from the fixed cams secured to the rotating shaft 17 by means of pivoted arms and connected rods, as clearly shown in the drawings, 18 representing the cams that operate the pistons through the rods 19, 30 the cams that operate the knuckle device through the arm 46 and rods 45, 50 the cams that operate the explosion-valve 26 through the rods 52, and 51 the cams that operate the gas-inlet valve 24, the connecting-rods being provided with adjusting devices 31 for varying their length and the consequent movement or travel of the movable pistons or valve devices and the form of the cam-faces made to transmit their movement at the proper period required in the method of operation, all of which is understood by designers and constructors of this class of machinery.

The reversing-valve 27, located in the water-conduit at the junction of its branches and the communicating passage from the explosion-cylinder, is constructed to control the respective channels through which the water is admitted to the conduit and through which the explosive force is directed to its outlet to cause the vessel to move forward or backward, as desired. It is operated through the medium of the quadrant-rack 32 and pinion 33, valve-connecting rod 34, link 35, rod 36, and lever-arm 37, engaging the cam 38, as clearly shown in Fig. 1. The mechanism for reversing the position of this valve is also shown in this figure, consisting of the rod 39, pivoted to the valve-rod 34, vibrating-lever 40, rod 41, and detent-lever 42, which operates to shift the position of the link-block 43 within the link by a throw of the detent-lever 42 in the manner usual in reversing mechanism.

In Fig. 1 the reversing mechanism is shown at its midway position, which places the valve 37 in position to close the communicating passage from the explosion-chamber to the conduit and allows a free passage for the water through the latter.

In Fig. 2 the position of the parts is shown at one extreme throw of the operating detent-lever, which causes the valve to close one branch of the water-conduit, the extreme opposite throw of the lever being also shown in dotted lines in this figure, which reverses the position of the valve and closes the opposite branch of the conduit, these operations governing the expelling of the water in conformity with the desired direction of either the forward or backward movement of the vessel.

In conjunction with the full and complete illustration in the drawings hereto annexed the foregoing description sets forth all the essential reference to the characteristics of the apparatus in construction and operation necessary to enable any person skilled in the art of engine construction and management to make and use the same.

What I desire to secure by Letters Patent is—

1. In an apparatus for propelling vessels by the reactionary force of explosive gases, a submerged water-conduit; an explosion-cylinder communicating with said conduit; a charging and compressing piston in the cylinder, and a valve controlling the conduit so constructed and timed as to open the conduit to fill the same while the charge is being drawn in and compressed whereby the greater period of time in the cycle of operation is simultaneously utilized to prepare the gas and water for action, as set forth.

2. In an apparatus for propelling vessels by the reactionary force of explosive gases, a submerged water-conduit; an explosion-cylinder communicating with said conduit, a reciprocating piston in the cylinder having a continuous movement in one direction for drawing in the charge and an intermittent movement in the other direction for compressing the charge and driving out the products of combustion, and a valve controlling the conduit so constructed and timed as to open the conduit to fill the same while the charge is being drawn in and compressed, as set forth.

3. In an apparatus for propelling vessels by an explosive force, an explosion-cylinder wherein the compression and ignition take place, and wherein the explosive is ignited without transfer or expansion after compression, combined with a submerged water-conduit, said cylinder and conduit communicating with each other, and the cylinder having a valved exhaust-port leading to the conduit for opening and closing the communication, as set forth.

4. In an apparatus for propelling vessels by an explosive force, a submerged water-conduit, an explosion-chamber having a compressing-piston, an inlet for explosive material and an outlet for products of combustion communicating with said conduit, said inlet and outlet being fitted with suitable valves and operating means therefor, as set forth.

5. In an apparatus for propelling vessels by the reactionary force of explosive gases, a cylinder wherein the explosive is compressed and ignited, having a reciprocating piston and devices for arresting said piston at a desired position of its compression-stroke, and locking the same during the interval of explosion, as set forth.

6. In an apparatus for propelling vessels by the reactionary force of explosive gases, an explosion-cylinder having a reciprocating piston, devices for giving the same an intermittent movement during one stroke, and a continuous movement during the other stroke, and devices for admitting and igniting the explosive whereby a new charge is admitted during one stroke, and is compressed, ignited and expelled during the other stroke, as set forth.

7. In an apparatus for propelling vessels by means of the reactionary force of explosive gases upon a body of water, a submerged conduit, a chamber wherein the explosive gases are compressed and ignited, provided with a release-valve opening to said conduit and a supplemental reversing-valve located in the conduit, as set forth.

8. An apparatus for propelling vessels by the reactionary force of explosive gases upon a body of water, a submerged conduit, communicating intermediately with a chamber wherein the gases are exploded and having branch passages in opposite directions, a reversible valve device interposed at the junction of the passages, operated to close the passage from the conduit to the explosion-chamber and also the inlet branch of the conduit in either direction desired, and to open the passage from the explosion-chamber to the outlet branch, as set forth.

9. The combination with an explosive-cylinder of a communicating submerged conduit with inlet and outlet passages and an interposed and reversible valve device that operates to open the communicating passage between the cylinder and the outlet of the conduit to expel the water; to close the communicating passage between the inlet and outlet branches of the conduit during the action of the explosive and expulsion of the water and gases; to close the passage between the cylinder and the conduit, and to open the passage between the inlet and outlet of the conduit to admit the water thereto at each interval of explosive action in the cylinder, as set forth.

10. An apparatus for propelling vessels by means of the reactionary force of explosive gases consisting, essentially, in an explosion-cylinder having a reciprocating compressing-piston and a submerged water-conduit communicating therewith and valve devices for governing the respective inlets and outlets of said cylinder and conduit, operated by an independent source of power, as set forth.

11. In an apparatus for propelling vessels by an explosive force, an explosion-chamber having a piston with an intermittent movement and a water-conduit communicating with said chamber that is filled and exhausted during each cycle of movement of said piston, fitted with a valve device that is operated to open for the inlet of the water to said conduit during the greater part of said cycle of movement of the piston and closed during the remainder or lesser part, whereby the entering water is given an extended period to fill the conduit at each double stroke of the piston, as set forth.

JOHN A. SECOR.

Witnesses:
CHAS. A. STERLING,
W. F. SCANTLEBURY.